June 27, 1967 F. R. LENNOX 3,327,349
EXTRUSION ADAPTOR
Filed Aug. 30, 1965

INVENTOR.
Forrest R. Lennox
BY
AGENT

United States Patent Office 3,327,349
Patented June 27, 1967

3,327,349
EXTRUSION ADAPTOR
Forrest R. Lennox, Coleman, Mich., assignor to The Dow Chemical Company, Midland, Mich., a corporation of Delaware
Filed Aug. 30, 1965, Ser. No. 483,740
3 Claims. (Cl. 18—13)

This invention relates to an extrusion adaptor and more particularly to an extrusion adaptor for the preparation of multi-layer film.

Multi-layer film may be prepared by the coextrusion or simultaneous extrusion of two or more diverse synthetic resinous polymeric materials from a single die orifice in such a manner that two or more distinct and definite layers of film are obtained.

One particularly beneficial and advantageously manner of preparing such multi-layer film is by the use of an extrusion adaptor interposed between two or more extruders or supply streams of heat-plastified synthetic resinous material, the adaptor providing a composite stream having a generally circular outer configuration and of material from which the outer layer or layers of the film are to be prepared, the composite stream having inner portions of a generally elongate configuration, forcing the composite stream into a sheeting die wherein the elongate configuration of the inner portions of the stream is generally parallel to the slot of the sheeting die. One particularly beneficial and advantageous embodiment of such an adaptor uses generally annular plenum for each stream other than the central stream. The annular plenum or plenums receive polymer from a polymer source which flows about the annular plenums and through an annular passageway to envelope the central stream or an encased central stream with the desired polymeric material in providing polymeric material to an annular chamber of plenum flow from the imput is discharged about the plenum and forms a weld line. This weld line is generally observable in the finished product and is undesirable as it adds an irregularity to the finished product.

It would be beneficial if there were available an extrusion adaptor particularly suited to be interposed between two or more extruders and a sheeting die for the production of composite layered film which would eliminate a weld line appearing in the outer layer of the film or indeed any of the inner layers. An adaptor in accordance with the present invention comprises a housing defining a generally centrally disposed extrusion passageway having a discharge end adapted to communicate with a sheeting die, the central passageway having an inlet end adapted to communicate with a first source of heat-plastified synthetic resinous material, at least one generally annular plenum and a plenum passageway, the plenum passageway communicating with the plenum and adapted to communicate with a second source of heat-plastified synthetic resinous material, the housing defining an annular passageway adapted to provide communication between the central passageway and the plenum and permit flow from the plenum passageway to be deposited in a generally annular manner into the central passageway, at least a bushing disposed within the central passageway having an inlet end in communication with the inlet end of the central passageway and a discharge end in communication with the discharge end of the central passageway, the discharge end of the bushing being disposed between the annular passageway and the discharge end of the central passageway, the discharge end of the bushing having a discharge opening of a generally elongate cross sectional configuration, the improvement which comprises a dam within the generally annular plenum, the dam being disposed generally within a plane containing the major axis of the elongate configuration of the bushing discharge opening and the major axis of the central passageway.

Further features and advantages of the present invention will become more apparent from the following specification taken in connection with the drawing wherein.

Figure 1:
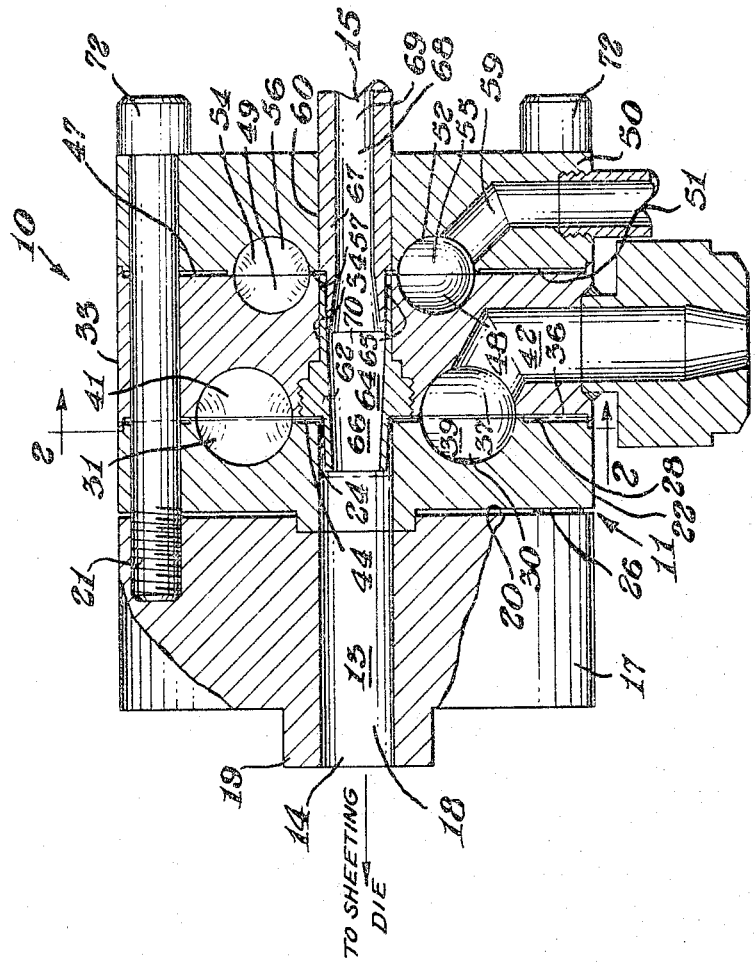
FIGURE 1 is a sectional view of one embodiment of an extrusion adaptor with the present invention.

In FIGURE 1 there is illustrated an extrusion adaptor in accordance with the present invention, generally designated by the reference numeral 10. The extrusion adaptor 10 comprises a housing 11. A generally cylindrical centrally disposed passageway 13 is defined within the housing 11. The passageway 13 has an exit or discharge end 14, and an inlet 15 adapted to receive heat plastified synthetic resinous thermoplastic material. The housing 11 comprises a first body portion 17. The body portion 17 defines a generally centrally disposed cylindrical passageway 18 which forms part of a central passageway 13. The body portion 17 defines a boss 19 adapted to mate in sealing engagement with an extrusion die or a conduit leading to an extrusion die. A generally radially extending face 20 is defined by the housing 17 and remotely disposed from the boss 19 and the discharge end 14 of passageway 13. The first housing portion 17 defines a plurality of internally threaded apertures 21 disposed in general peripherally about the body portion 17 and disposed in the face 20.

A second body portion 22 is disposed adjacent the first body portion 17, the second body 22 defines an internal passageway generally designated by the reference numeral 24. The passageway 24 serves to define a portion of passageway 13. The second body portion 22 defines a generally radially outwardly extending surface 26 adapted to engage the face 20 of the first body portion 17 end by a sealing engagement therewith. Remotely disposed from the face 26 is a radially outwardly extending face 28 having defined therein a generally annular groove or recess 30. The recess 30 is generally symmetrically disposed about the passageway 24. The body portion 22 defines a dam portion 31. A third body portion 33 is disposed adjacent the second body portion 22. The third body portion 33 defines an internal passageway 34 which is a portion of passageway 13 and generally coaxially disposing with relationship to the passageway 24 and 18 of the body portions 22 and 17 respectively. The body portion 33 defines a generally radially outwardly extending surface 36. The surface 36 has defined therein a generally annular cavity 37 adapted to mate with the annular cavity 30 of the body portion 22, and defines a generally annular or toroidal cavity or passage 39. The body portion 33 defines a dam portion 41 disposed within the annular recess 37 and adapted to cooperate with the dam 31 of the body portion 22 to effectively close the generally annular passage 39. The body portion 33 defines an internal polymer passageway 42. The passageway 42 is in full communication with the passageway or plenum 39. The passageway 42 is adapted to be in communication with a source of heat-plastified thermoplastic resinous material. The faces 28 of the body portion 22 and 36 of the body portion 33 serve to define a generally radially extending annular passageway 44 disposed between the central passageway 13 and the plenum 39. The passageway 44 has an extruding cross-sectional area substantially less than the cross-sectional area of the plenum, and in effect is an internal inwardly extruding die orifice. Remotely disposed from the face 36 is a radially outwardly extending face 47 of the body portion 33. The face 47 has defined therein a generally annular recess 48 which is generally coaxially disposed relative to the passageway 34. A dam portion 49 is disposed within the recess 48. A fourth body portion 50 is disposed adjacent the third body portion 33. The body portion 50 has a radially outwardly extending face 51 which has defined therein a generally annular passageway 52. Within the annular passageway 52 is disposed a dam portion 54. The face 51 is adapted to mate in sealing engagement with the face 47 of the third body portion 33 wherein the annular plenum 55 has disposed therein a dam 56 comprising the dam portions 49 and 54. The faces 47 and 51 in the region between the plenum 55 and the centrally disposed passageway 13 define a generally radially disposed annular extrusion passageway 57, which provides communication between the annular plenum 55 and the passageway 13. The fourth body portion 50 defines a polymer passageway 59 which communicates with the plenum 55 and is adapted to receive a stream of heat plastified synthetic resinous material from a source not shown.

The fourth body portion 50 defines an internal generally centrally disposed passageway 60 which in turn forms a portion of passageway 13. A bushing 62 is deposited within the passageway 13 generally within the third body portion 33. The bushing 62 defines an internal passageway 64 having a first or entrance end 65. The internal cross-sectional configuration of the bushing is generally circular. The passageway 64 has a discharge end 66 disposed between the annular passageway 44 and the discharge end 14 of the internal passageway 13. The discharge end 66 of passage 64 through the bushing 62 has a generally elongate or rectangular configuration. The passage 64 is arranged generally coaxially with the passage 13 and forms a restriction within the passageway 13. The bushing 64 is supported by means of the third body portion 33. A second bushing 67 is disposed within the fourth body portion 50 within the passageway 60. The bushing 67 defines an internal passageway 68 providing communication between the entrance end 15, the passageway 13 and the passage 64 of the bushing 62. The passageway 68 has an entrance end 69, and an exit end 70. The entrance end 69 has a generally circular configuration, while the exit end 70 has a generally elongate configuration which beneficially is rectangular. The major axis of the elongate opening 70 of the bushing 67, and the elongate opening 66 of the bushing 62 are parallel or coplanar. A plurality of bolts 72 pass through the second to third and fourth body portions and engage the internally threaded cavities 21 of the first body portions 17 to maintain the various body portions in sealing engagement with each other.

Figure 2:
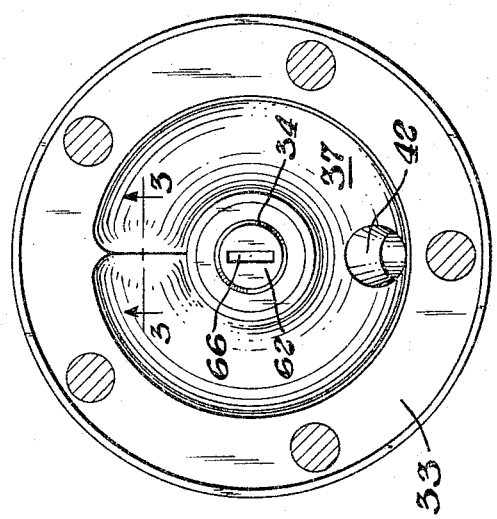
FIGURE 2 is a sectional view of the extrusion adaptor of FIGURE 1 taken along the line 2—2.

In FIGURE 2 there is illustrated a view of the body portion 33 wherein the configuration of the annular groove 37 is illustrated. The passageway 42 enters the groove or recess 37 at a location generally remote from the dam portion 41. The bushing 62 is disposed within the central passageway 34. The elongate opening 66 of the bushing 62 is oriented in such a manner that the major axis of the elongate opening, when projected, passes through the dam 41.

Figure 3:
FIGURE 3 is a sectional view of the dam of FIGURE 2 taken along the line 3—3 of FIGURE 2.

In FIGURE 3 there is illustrated a fractional sectional view of a portion of the dam 41 depicting its cross-sectional configuration.

Figure 4:
FIGURE 4 is a sectional view of the portion of the dam illustrated in FIGURE 3 taken along the line 4—4.

In FIGURE 4 there is illustrated a view of the configuration of the dam 41 taken along the line 4—4 of FIGURE 3. The dam portions 31, 49, and 54 have generally like configurations.

In operation of the extrusion adaptor in accordance with the present invention, a first polymer stream is supplied to the entrance end 15 of passageway 13. A second polymer stream is fed to the passageway 59 of the fourth body portion 50. A third polymer stream is fed to the passageway 42 of the third body portion 33. A sheeting die or slot die is affixed to the boss 19 of the first body portion 17, and the slot oriented to be generally parallel to the major axis of the elongate opening 66 of the bushing 62. The plenum 39 fills with polymeric material which is extruded radially inwardly through passageway 44. The dam formed by the dam portions 31 and 41 maintain a weld line at the location of the dam which is disposed generally in a plane containing the major axis of the cross-sectional configuration of the elongate opening 66. Similarly, polymer flowing into the plenum 55 divides and flows towards the dam 56 and forms its weld line adjacent the terminal end of the cross-sectional configuration of the elongate opening 70 of the bushing 67, as the material flowing through passageway 68 of the bushing 67 is then encapsulated within the material flowing from the plenum 55 through the annular passageway 57. The resultant composite stream is subsequently formed by the bushing 62 and emerges from the elongate opening 66 of the bushing 62 as an elongate stream of heat plastified thermoplastic resinous material having inner layer encapsulated within an outer layer. This inner stream is subsequently encapsulated within an outer stream of a material flowing from the plenum 39 through the passageway 44 and about the bushing 62. A three component composite stream is present in the passageway 13 adjacent the discharge end 14, the composite stream has deposited therein as a central core material from the first polymer source encapsulated within material from the second polymer source. The material from the first and second polymer sources having a generally elongate configuration whereas the material from the plenum 39 has a generally cylindrical configuration. As this composite stream passes through a slot or sheeting die, the entire stream spreads and emerges from the die as a material having approximately 5 layers. The outer layers being the material from the plenum 39, intermediate layers are formed by material from the plenum 55 and the central layer of the material fed to the inlet end 15 of the passageway 13. No apparent weld line exists within the main body of the film or sheet as the weld lines are disposed on the edge of the sheet which usually is trimmed prior to the final use of the film.

By way of further illustration, a five-layer film is prepared by the extrusion of a copolymer of 85 weight percent vinylidene chloride and 15 weight percent vinyl chloride plasticized with 4½ parts by weight acetyl tributyl citrate and one part by weight of an epoxidized soya bean oil commercially available under the trade designation of Paraplex G60, ¾ of a part by weight of tertiarybutylsalol. In a heat plastified condition, this material is supplied to the entrance passage 15 of an adaptor substantially as illustrated in FIGURE 1. A heat plastified copolymer of 72 weight percent ethylene and 28 weight percent vinyl acetate having a melt index of 3 is supplied to the passageway 59. Polyethylene having a density of 0.934 gram per cubic centimeter and a melt index of 3.8 is supplied to passageway 42. The material issuing from the slot of the extrusion die is cast on to a polished cooled roll. The resultant film has a thickness of about 4.1 mils. The polyethylene outer layers have a thickness of about 1.7 mils. The centrally disposed vinylidene chloride copolymer has a thickness of about 0.25 mil, while the ethylene-vinyl acetate copolymer intermediate layers have a thickness of about 0.15 mil. The resultant film is clear, transparent, and no evidence of weld line within the main body of the film is observed. By way of comparison, a film is prepared in a similar manner with the exception that no dams corresponding to the dams 56 and the dam portions 31 and 41 are present in the extrusion adaptor. A weld line could be detected adjacent one edge of the film and tended to wander as the extrusion proceeded.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An extrusion adaptor particularly suited to be interposed between two or more sources of heat plastified synthetic resinous material, and a sheeting die for the simultaneous or coextrusion of a multi-layer plastic film or sheet, the adaptor comprising a housing defining a generally centrally disposed extrusion passageway having a discharge and adapted to communicate with a sheeting die, the central passageway having an inlet end adapted to communicate with a source of heat-plastified synthetic resinous material, at least one generally annular plenum and a plenum passageway, the plenum passageway communicating with the plenum and adapted to communicate with a second source of heat-plastified synthetic resinous material, the housing defining an annular passageway providing communication between the central passageway and the plenum and permitting flow from the plenum be in a generally inwardly annular manner into the central passageway, at least one bushing disposed within the central passageway, the bushing having an inlet end in communication with the inlet end of the central passageway, the discharge end of the bushing being disposed between the annular passageway and the discharge end of the central passageway, the discharge end of the bushing having a discharge opening of generally elongate cross-sectional configuration, the improvement which comprises a dam within the generally annular plenum, the dam blocking flow within the plenum and the dam being disposed generally in a plane containing the major axis of the elongate configuration of the bushing discharge opening and the major axis of the central passageway.

2. The apparatus of claim 1 wherein the housing defines at least two generally annular plenums and contains at least two bushings each having elongate discharge openings, wherein the major axis of the elongate openings are generally parallel and a dam is disposed in each of the plenums, the dams lying generally in a plane containing the major axis of the elongate openings.

3. The apparatus of claim 1 wherein the housing comprises a plurality of portions and the plenum is defined by adjacent housing portions.

References Cited
UNITED STATES PATENTS

| | | | |
|---|---|---|---|
| 1,637,207 | 7/1927 | Whitehouse. | |
| 1,978,163 | 10/1934 | Megow | 18—13 XR |
| 2,524,829 | 10/1950 | Perzel | 18—13 |
| 2,820,249 | 1/1958 | Colombo | 18—13 |
| 2,977,632 | 4/1961 | Bunch | 18—13 |
| 3,121,255 | 2/1964 | Henning et al. | 18—13 |
| 3,189,941 | 6/1965 | Reifenhauser | 18—13 |
| 3,227,103 | 1/1966 | Schafer | 18—13 XR |
| 3,241,503 | 3/1966 | Schafer | 18—13 XR |

FOREIGN PATENTS

| | | |
|---|---|---|
| 520,637 | 6/1953 | Belgium. |
| 985,310 | 3/1965 | Great Britain. |
| 1,203,657 | 8/1959 | France. |

WILLIAM J. STEPHENSON, *Primary Examiner.*